(12) United States Patent
McCann et al.

(10) Patent No.: US 6,811,004 B1
(45) Date of Patent: Nov. 2, 2004

(54) VEHICLE BRAKE ASSEMBLY HAVING A BEARING BLOCK CLOSURE AND METHOD OF ASSEMBLY THEREFOR

(75) Inventors: Denis John McCann, Powys (GB); Paul A. Thomas, Newport (GB); Carl E. Heinlein, Newport (GB)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/435,138

(22) Filed: May 9, 2003

(51) Int. Cl.[7] .......................... F16D 55/08; F16D 55/16
(52) U.S. Cl. ................. 188/72.9; 188/73.31; 188/73.34
(58) Field of Search ............... 188/71.1, 72.1, 188/72.6, 72.7, 72.8, 72.9, 73.1, 73.31, 73.33, 73.34, 73.41; 29/434

(56) References Cited

U.S. PATENT DOCUMENTS

| | | | | |
|---|---|---|---|---|
| 5,379,867 A | * | 1/1995 | Macke et al. | 188/71.9 |
| 5,433,298 A | * | 7/1995 | Antony et al. | 188/72.7 |
| 5,547,048 A | * | 8/1996 | Anthony | 188/72.9 |
| 5,833,035 A | * | 11/1998 | Severinsson | 188/72.7 |
| 5,848,673 A | * | 12/1998 | Strauss et al. | 188/1.11 L |
| 5,927,445 A | | 7/1999 | Bieker et al. | |
| 6,336,686 B2 | * | 1/2002 | Thomas et al. | 303/2 |
| 6,435,319 B1 | | 8/2002 | Thomas et al. | |
| 6,481,542 B2 | * | 11/2002 | Giering et al. | 188/71.7 |

* cited by examiner

Primary Examiner—Robert A. Siconolfi
Assistant Examiner—Devon Kramer
(74) Attorney, Agent, or Firm—Carlson, Gaskey & Olds

(57) ABSTRACT

A vehicle brake assembly includes a first brake housing portion having an assembly opening formed through a rear face. The rear face is substantially opposite and parallel to a front face which faces toward a brake rotor. A bearing block includes a lever receipt portion and a cover portion. The cover portion fits within the assembly opening to close the assembly opening and the lever receipt portion of the bearing block supports the lever assemby. The lever assembly is passed through the assembly is passed through the assembly opening and the bearing block is passed through the front opening in the front face. The component positions may then be exchange within the hosing portion such that the cover portion of the bearing block is fit into assembly opening and welded in place prior to support of the lever assembly.

6 Claims, 4 Drawing Sheets

VEHICLE BRAKE ASSEMBLY HAVING A BEARING BLOCK CLOSURE AND METHOD OF ASSEMBLY THEREFOR

BACKGROUND OF THE INVENTION

The present invention relates to a vehicle brake assembly and, more particularly, to a brake housing having a bearing block which closes an assembly opening and a method of assembly therefor.

Disc brake assemblies typically include a disc brake caliper that houses a piston for forcing a pair of friction elements or brake pads into engagement with a rotor. Heavy-duty vehicle brake assemblies commonly include multiple pistons that are actuated by a cam manipulated by a pneumatic actuator. The heavy-duty brake assemblies may be relatively complicated compared to passenger vehicle brake assemblies and may be specifically tailored to particular heavy vehicle applications.

Various assembly line sequence limitations may require later assembly of certain brake mechanism components within the housing. One assembly line sequence limitation may be the desire to manufacture each brake assembly in an identical manner and assemble unique components for specific vehicle applications at final assembly stages to minimize tracking each brake assembly through the entire assembly process.

Disadvantageously, a relatively large number of individual brake components may already be assembled by the time the brake assembly reaches the final assembly stages. Assembly limitations stemming from the previously assembled components may then have to be addressed by utilizing different and perhaps small or less convenient housing openings to assemble the remaining components.

Accordingly, it is desirable to provide a vehicle brake assembly which allows unique component installation during the final assembly stages while maintaining component reliability.

SUMMARY OF THE INVENTION

The vehicle brake assembly according to the present invention provides a brake housing having an assembly opening formed through a rear face. The rear face is substantially opposite and parallel to a front face which faces toward a brake rotor.

A bearing block includes a lever receipt portion and a cover portion. A flange is defined by the lever receipt portion which extends from the outer perimeter of the cover portion. The cover portion fits within the assembly opening to close the assembly opening. An engagement surface supports the flange and the bearing block within a housing portion.

An assembly sequence of the present invention utilizes the assembly opening. The lever assembly is passed through the assembly opening and the bearing block is passed through the front opening in the front face. The component positions may then be exchanged within the hosing portion such that the cover portion of the bearing block is fitted into the assembly opening. Needle bearings are located upon the lever receipt portion of the bearing block to receive the lever assembly.

The present invention therefore provides a vehicle brake assembly which allows unique component installation during the final assembly stages while maintaining component reliability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
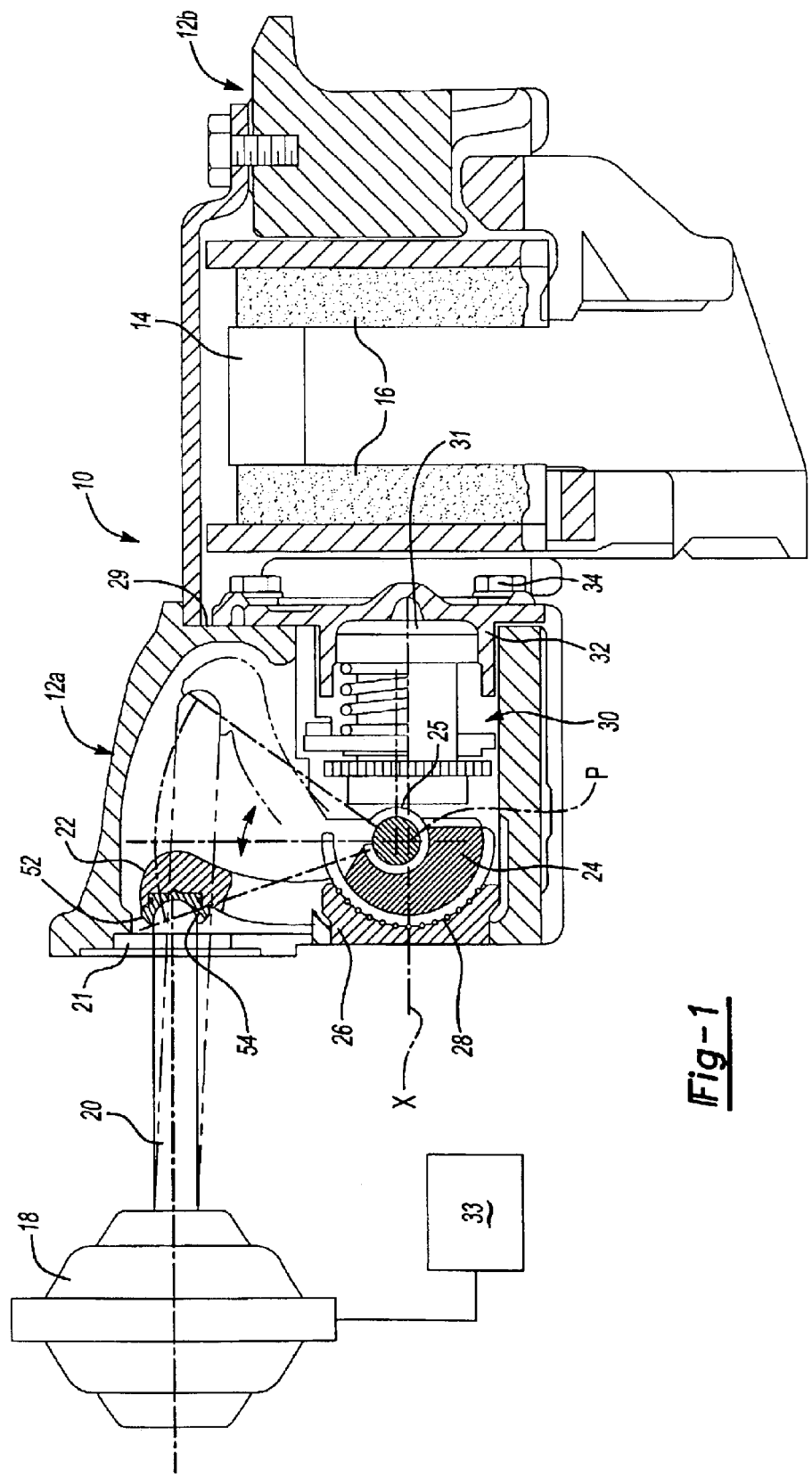
FIG. 1 is a cross-sectional end view of a vehicle brake assembly of the present invention.

FIG. 1 illustrates a general sectional view of a vehicle brake assembly 10. The vehicle brake assembly 10 may be constructed from one or more housing portions 12a, 12b. A rotor 14 is arranged within the housing portion 12b which at least partially contains a set of brake pads 16, or friction elements, arranged on either side of a brake rotor 14.

An actuator 18, typically an air chamber, actuates a brake actuation mechanism 30 to force the brake pads 16 into engagement with the rotor 14. The actuator 18 drives a push rod 20 through a push rod opening 21 to rotate a lever assembly 22 about a pivot axis p. The lever assembly 22 includes a cam 24 having a profile 25 that cooperates with a bearing block 26 and a brake actuation mechanism 30. The cam 24 is received at least partially within the bearing block 26. The cam 24 is supported by a plurality of needle bearings 28 such that the cam 24 moves in an eccentric actuating arrangement relative the bearing block 26 to drive the brake actuation mechanism 30 and the brake pads 16. It should be understood that various actuating systems which are operated by a lever will benefit from the present invention.

An opening 31 of the housing portion 12a is closed off on the front face 29. That is, the front face 29 is positioned to face the brake rotor 14. A closing plate 32 which may at least partially support the brake actuation mechanism 30 closes the opening 31. The closing plate 32 is attached to the housing 12 by fasteners 34 or the like. Sealing elements are preferably located upon the scaling surfaces between the closing plate 32 and the housing 12a.

In operation, upon actuation of the brake pedal by the vehicle operator, a pneumatic output is typically produced by a control module 33 to energize the actuator 18. Heavy-duty vehicle brake assemblies typically include a pair of pistons 36 (FIG. 2) that transmit the force generated by the actuator 18 through the push rod 20, the lever assembly 22, and the brake actuation mechanism 30. It is to be understood that any suitable number of pistons 36 may be used.

Figure 2:
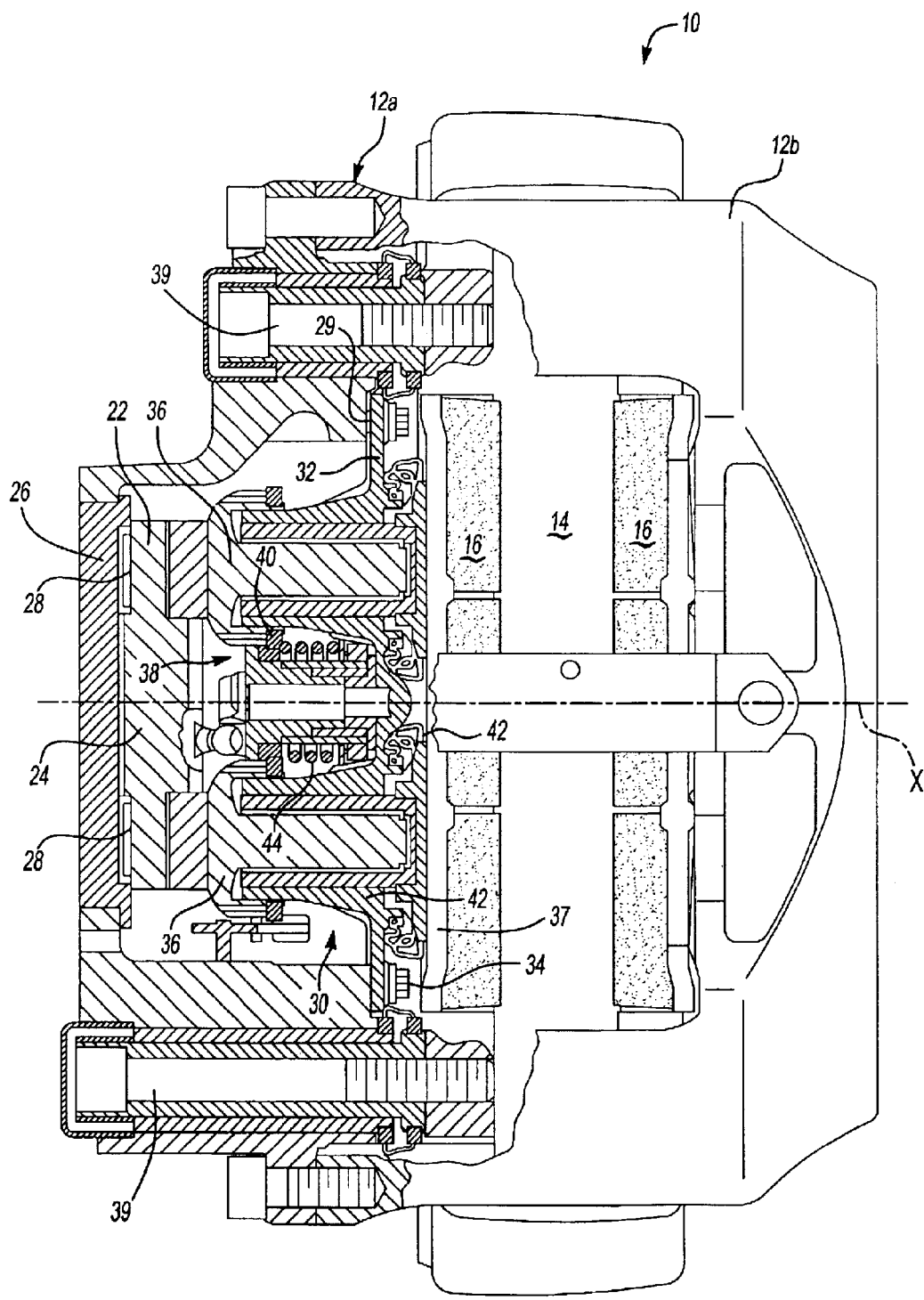
FIG. 2 is a cross-sectional top elevation view of the present invention.

Referring to FIG. 2, the pistons 36 drive an actuating plate 37 which drives the brake pads 16 into engagement with the rotor 14. As the actuating force increases, the brake pad 16 on the other side of the rotor 14 is drawn into engagement with the rotor 14 via the sliding system. The actuating plate 37 moves relative the closing plate 32 and is sealed therewith through a seal 42.

After the brakes are actuated, the brake pads 16 must be retracted to prevent the brake pads 16 from dragging on the rotor 14. To this end, a return assembly 38 operates to retract the pistons 36. The return assembly 38 generally includes a plate 40 adjacent to a return spring 44. The return spring 44 is arranged between a portion of the housing 12*a* and the plate 40. The return spring 44 applies a force opposite the actuation force to the plate 40 and into the pistons 36 to retract the actuating plate 37 and the brake pads 16.

Figure 3:
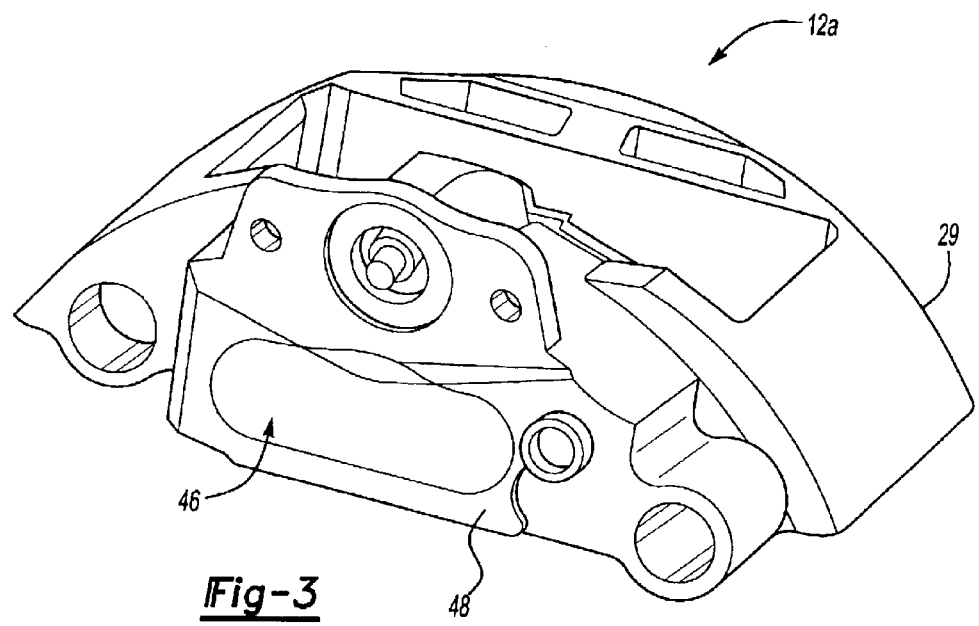
FIG. 3 is a rear expanded view of a housing portion having an assembly opening.

Referring to FIG. 3, an assembly opening 46 is formed through the rear face 48 of housing portion 12*a*. The rear face 48 is located substantially parallel and opposite to the front face 29 (FIG. 1). It should be understood that relative positional terms such as "front," "aft," "upper," "lower," "above," "below," and the like are with reference to the normal operational attitude of the vehicle and should not be considered otherwise limiting.

Figure 4:
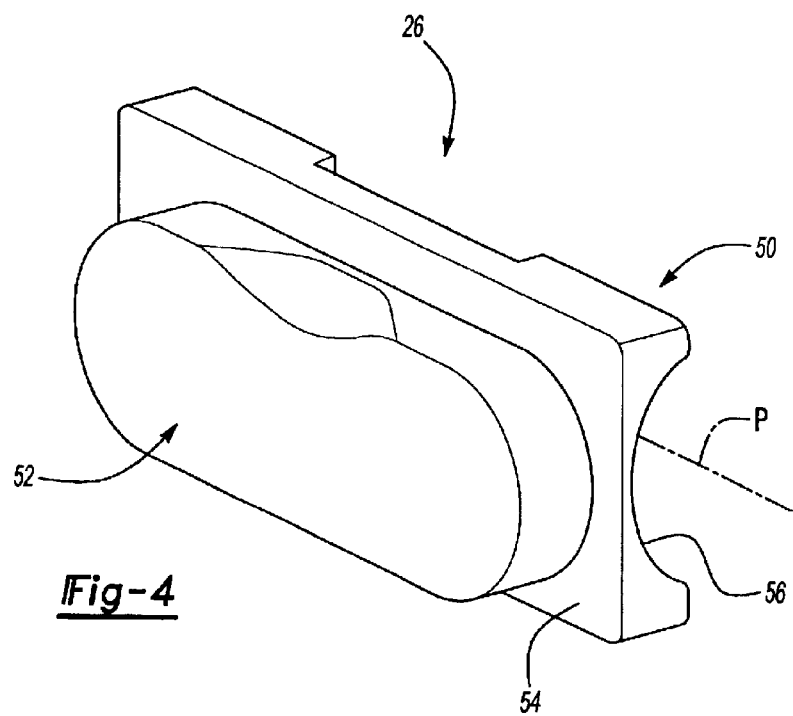
FIG. 4 is an expanded view of a bearing block showing the cover portion thereof.

Referring to FIG. 4, the bearing block 26 includes a lever receipt portion 50 and a cover portion 52. Preferably, the bearing block 26 is a single integral component. The cover portion 52 is defined substantially within the outer perimeter defined by the lever receipt portion 50. That is, a flange 54 is defined by the lever receipt portion 50 which extends from the outer perimeter of the cover portion 52.

Figure 5:
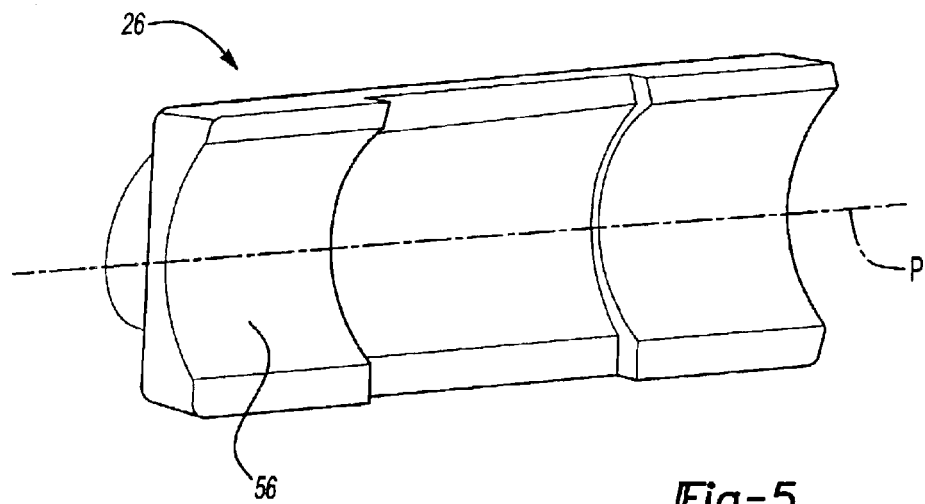
FIG. 5 is an expanded view of a bearing block showing the lever receipt portion thereof.
Figure 6:
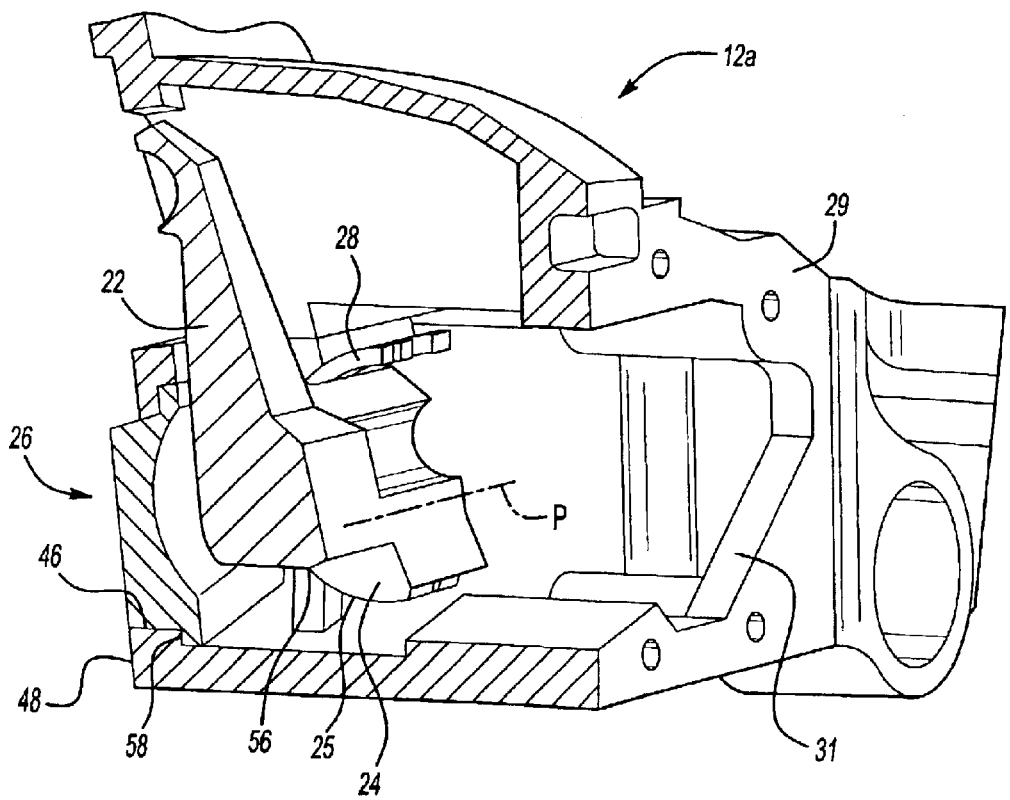
FIG. 6 is a sectional view of the housing portion having the bearing block positioned therein and the lever assembly mounted thereto.

The lever receipt portion 50 defines an arcuate surface 56 (also illustrated in FIG. 5) relative the pivot axis p. The arcuate surface 56 supports the needle bearings 28 and the cam 24 (FIG. 6). The profile 25 of the cam 24 rides upon the needle bearings 28 which are further supported by the arcuate surface 56 such that the lever assembly 22 pivots about pivot axis p.

Referring to FIG. 6, the cover portion 52 fits within the assembly opening 46. An engagement surface 58 defined about the assembly opening 46 engages the flange 54. The engagement surface 58 is relatively flat and parallel to the front face 29 (FIG. 1). That is, the flange 54 mates against the engagement surface 58 such that the cover portion 52 fits closely into the assembly opening 46 while the flange 54 retains the bearing block 26 within the housing portion 12*a*.

The bearing block 26 is preferably fixed to the housing portion 12*a* through welding or the like. The engagement surface 58 supports the flange 54 and the bearing block 26. The brake actuation force through the lever assembly 22 is unidirectional. The force of actuating the brake actuation mechanism 30 with the lever assembly 22 is supported by the flange and engagement surface 58. The bearing block 26 may alternatively be fastened or otherwise attached in place.

An assembly sequence for the present invention utilizes the assembly opening 46 and the front opening 31. The lever assembly 22 is passed through the assembly opening 46 and the bearing block 26 is passed through the front opening 31 in the front face 29. The component positions may then be exchanged within the hosing portion 12*a* such that the cover portion 52 of the bearing block 26 is fit into assembly opening 46.

The needle bearings 28 are located upon the arcuate surface 56 of the bearing block 26 to receive the cam surface 24 of the lever assembly 22. The brake actuation mechanism 30, closing plate 32, and housing portion 12*b* may then be assembled to housing portion 12*a* (FIGS. 1 and 2).

It should be understood that various assembly line sequence requirements may require assembly of the bearing block 26, needle bearings 28, and/or the lever assembly 22 through either the front opening 31 or the assembly opening 46. Each component may fit through only a particular opening necessitating the re-arrangement within the housing. The addition of the assembly opening 46 provides additional flexibility with regard to accommodating specific assembly line sequence requirements.

Providing a separate bearing block 26 assures efficient machining thereof. Moreover, the utilization of the assembly opening 46 which is closed by the bearing block 26 itself rather than a separate closure member minimizes part count and expense.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of assembling a vehicle brake housing comprising the steps of:
    (1) assembling a lever assembly through an assembly opening located substantially parallel to a first opening, said first opening formed in a first face of a first brake housing portion;
    (2) assembling a bearing block through the first opening; and
    (3) closing the assembly opening with the bearing block.

2. A method as recited in claim 1, further comprising the step of:
    assembling a second brake housing portion to the first brake housing portion adjacent said first face.

3. A method as recited in claim 1, further comprising the steps of:
    assembling a brake actuation mechanism through the first opening.

4. A method as recited in claim 1, further comprising the steps of:
    attaching the bearing block into the assembly opening.

5. A method as recited in claim 1, further comprising the steps of:
    exchanging a position of the lever assembly with the bearing block within the first brake housing portion after said step (2).

6. A method as recited in claim 5, wherein said step (3) includes:
    fitting a portion of the bearing block through the assembly opening.

* * * * *